(12) United States Patent
Huber et al.

(10) Patent No.: US 11,717,957 B2
(45) Date of Patent: Aug. 8, 2023

(54) POSITIONING DEVICE

(71) Applicant: Physik Instrumente (PI) GmbH & Co. KG, Karlsruhe (DE)

(72) Inventors: Stephanie Huber, Karlsruhe (DE); Christian Rudolf, Karlsbad (DE); Harry Marth, Waldbronn (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 125 days.

(21) Appl. No.: 17/607,440

(22) PCT Filed: Apr. 28, 2020

(86) PCT No.: PCT/DE2020/100343
§ 371 (c)(1),
(2) Date: Oct. 29, 2021

(87) PCT Pub. No.: WO2020/221396
PCT Pub. Date: Nov. 5, 2020

(65) Prior Publication Data
US 2022/0203516 A1  Jun. 30, 2022

(30) Foreign Application Priority Data
Apr. 29, 2019  (DE) .................... 10 2019 111 026.2

(51) Int. Cl.
*B25J 9/10* (2006.01)
*B25J 9/00* (2006.01)

(52) U.S. Cl.
CPC .............. *B25J 9/0069* (2013.01); *B25J 9/10* (2013.01)

(58) Field of Classification Search
CPC ................................. B25J 9/0069; B25J 9/10
(Continued)

(56) References Cited

FOREIGN PATENT DOCUMENTS

| CN | 101246751 A | 8/2008 |
|----|-------------|--------|
| CN | 100585743 C | 1/2010 |

(Continued)

OTHER PUBLICATIONS

Notification of the First Office Action dated Aug. 17, 2022, by the Chinese Patent Office in corresponding Chinese Patent Application No. 202080032041.2, and an English Translation of the Office Action. (11 pages).

(Continued)

*Primary Examiner* — William C Joyce
(74) *Attorney, Agent, or Firm* — Buchanan Ingersoll & Rooney PC

(57) ABSTRACT

A positioning device is disclosed which can include a base and a positioning element, which is configured to be adjusted with respect to six degrees of freedom relative to the base, wherein the positioning element is coupled to the base via at least three pairs of length-variable and electrically driven leg elements, and each leg element is connected, at its respective ends, to the base and the positioning element via an articulation element. A respective pair of legs projects through another pair of legs and each pair of legs is arranged perpendicular to the respective other pairs of legs. According to exemplary embodiments, each of the articulation elements associated with a leg element has only two axes of rotation (DA), which are arranged perpendicular to each other, so that the articulation elements allow pivotal movements of each respective leg element in precisely two planes that are perpendicular to each other and run through a longitudinal axis of the leg element, and at the same time prevent a rotational movement about a longitudinal axis of the leg element.

8 Claims, 5 Drawing Sheets

Figure 1:
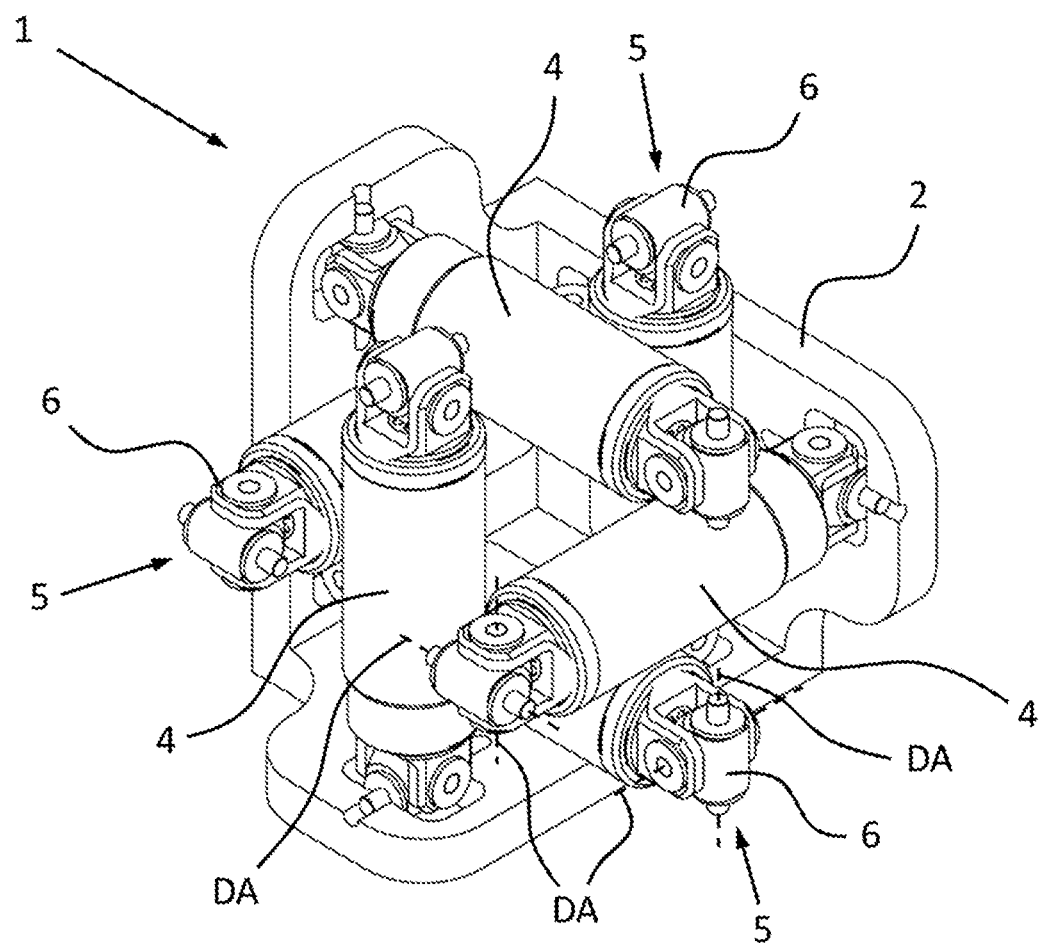

(58) Field of Classification Search
USPC .......................................... 74/480 R, 490.07
See application file for complete search history.

(56) References Cited

FOREIGN PATENT DOCUMENTS

| | | |
|---|---|---|
| CN | 103486413 A | 1/2014 |
| CN | 104742046 A | 7/2015 |
| CN | 105710867 A | 6/2016 |
| CN | 107639426 A | 1/2018 |
| CN | 108453704 A | 8/2018 |
| FR | 2604938 A1 | 4/1988 |

OTHER PUBLICATIONS

International Search Report (PCT/ISA/210) with translation and Written Opinion (PCT/ISA/237) dated Aug. 28, 2020, by the European Patent Office as the International Searching Authority for International Application No. PCT/DE2020/100343.
Legnani, G., et al., "A new isotropic and decoupled 6-DoF parallel manipulator", Mechanism and Machine Theory, Dec. 1, 2012, vol. 58, pp. 64-81 (11 pages).

POSITIONING DEVICE

The present invention relates to a positioning device according to claims 1 to 5.

Reference CN 100585743 C discloses a positioning device of the generic kind. An articulated connection provided between the driven legs and the base and the positioning element, respectively, and realizing the necessary degrees of freedom is implemented here by means of a so-called notch-type flexure hinge. This type of flexure hinge allows pivotal and/or tilting movements of the driven legs in an arbitrary number of directions. In addition, such a flexure hinge also allows rotations of the driven leg about its longitudinal axis, although to a lesser extent than the aforementioned pivotal and/or tilting movements. The number of degrees of freedom allowed by the flexure hinge disclosed in CN 100585743 C and resulting in a mechanically underconstrained system is, however, disadvantageous for certain cases of use, in particular those where high positioning accuracy is required in the case of large strokes or displacement distances of the driven legs and the positioning element, respectively.

Therefore, it is the object of the present invention to provide a positioning device, which is mechanically unequivocally constrained and which allows a high positioning accuracy even in the case of large strokes of the driven legs.

This object is achieved by a positioning device according to claim 1, the subclaims following this claim 1 describing at least expedient further developments.

Accordingly, a positioning device comprising a stationary base and a positioning element, which is adapted to be adjusted with respect to six degrees of freedom relative to the base, is taken as a basis, the positioning element being coupled to the base via at least three pairs of length-variable and electrically driven leg elements. For this purpose, each of the at least six leg elements is connected, at its two ends, to the base and the positioning element via an articulation element. The three pairs of leg elements are arranged relative to one another such that a respective pair of legs projects through another pair of legs and each pair of legs is arranged perpendicular to the respective other pairs of legs.

According to features that are essential to the present invention, each of the two articulation elements associated with a leg element has only two axes of rotation, which are arranged perpendicular to each other, so that the articulation elements allow pivotal movements or tilting movements of the respective leg element, on which the articulation elements are arranged, in precisely two planes that are perpendicular to each other and run through a longitudinal axis, preferably through the central longitudinal axis, of the leg element, and at the same time prevent a rotational movement about a longitudinal axis, preferably about the central longitudinal axis, of the leg element.

In this way, it is ensured that each leg element can exclusively carry out pivotal movements in two planes arranged perpendicular to each other. In addition, it is ensured that rotation of these leg elements about their respective longitudinal axis is prevented, thus allowing in particular the use of rotational drives for the length-variable leg elements, without the necessity of taking additional precautions to prevent leg element rotation caused by drive torques.

It may be of advantage when the articulation element is configured as a cardan joint or as a universal joint. Articulation elements configured in this way are commercially available in numerous variants and quality classes and can thus be used at a relatively reasonable price. In particular in comparison with flexure hinges, they allow significantly larger pivotal and/or tilting angles, with the same load-bearing capacity.

It may also be of advantage when the axes of rotation of the articulation element neither intersect nor penetrate each other. This results in high rigidity of the joint and a correspondingly rigid support of the leg elements.

In addition, it may be of advantage when the articulation element is configured as a ball joint comprising a spherical bearing head and a complementarily shaped bearing sleeve, in which the bearing head is arranged, the bearing head and the bearing sleeve having arranged between them a pin-shaped blocking element, which projects into and cooperates with a groove-shaped recess of the bearing head and which is simultaneously supported in an opening of the bearing sleeve.

Likewise, it may of advantage when each leg element is provided with a spindle drive for realizing a change in length. In this way, particularly large displacement distances of the leg elements can be realized.

Advantages and expedient features of the present invention can be seen more clearly from the following description of preferred embodiments on the basis of the figures, in which:

FIG. 1 shows a positioning device according to the present invention in a perspective view (positioning element omitted)

Figure 2:
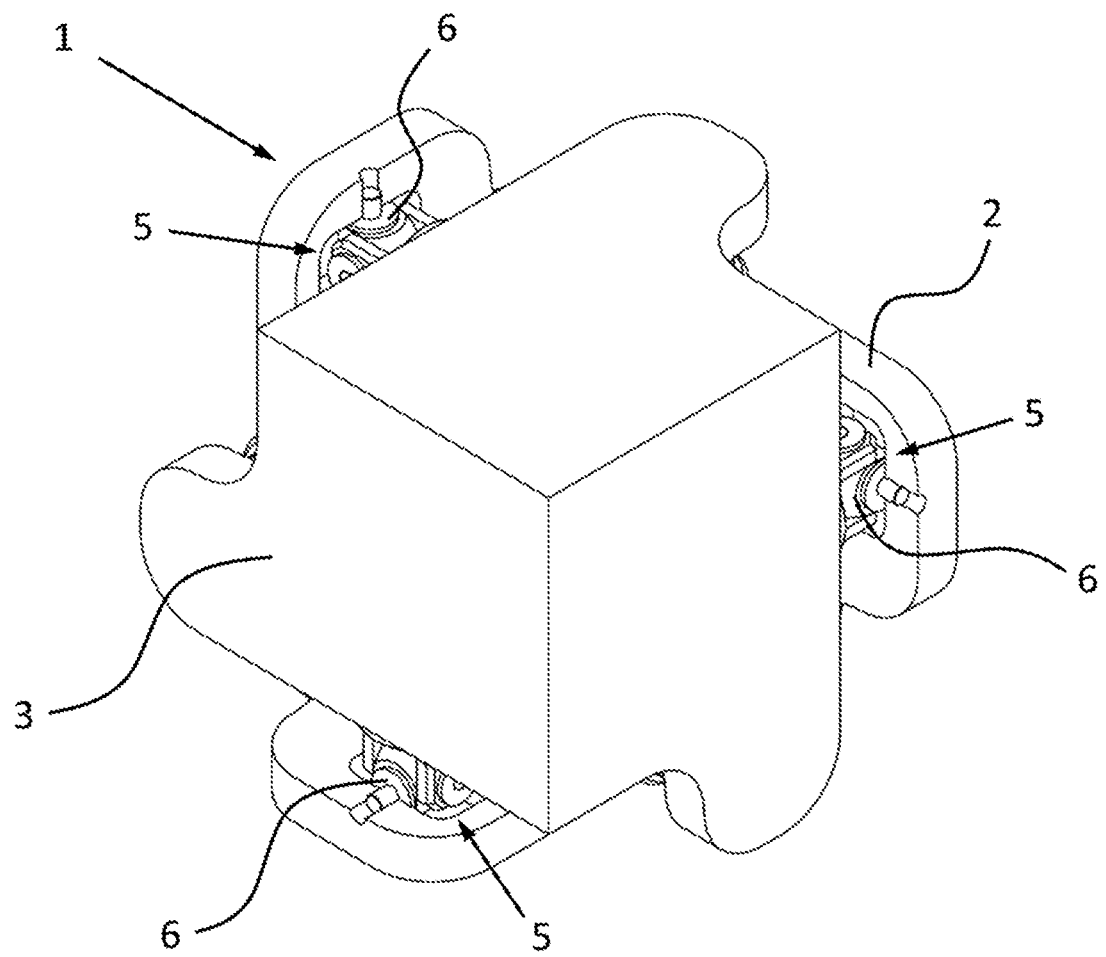
Figure 3:
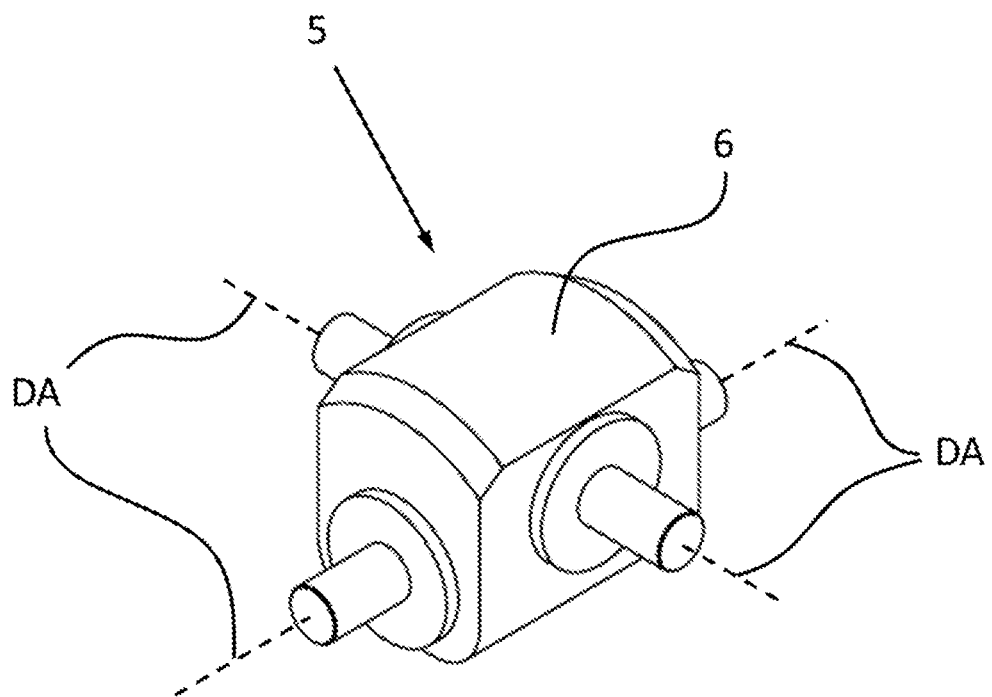
Figure 4:
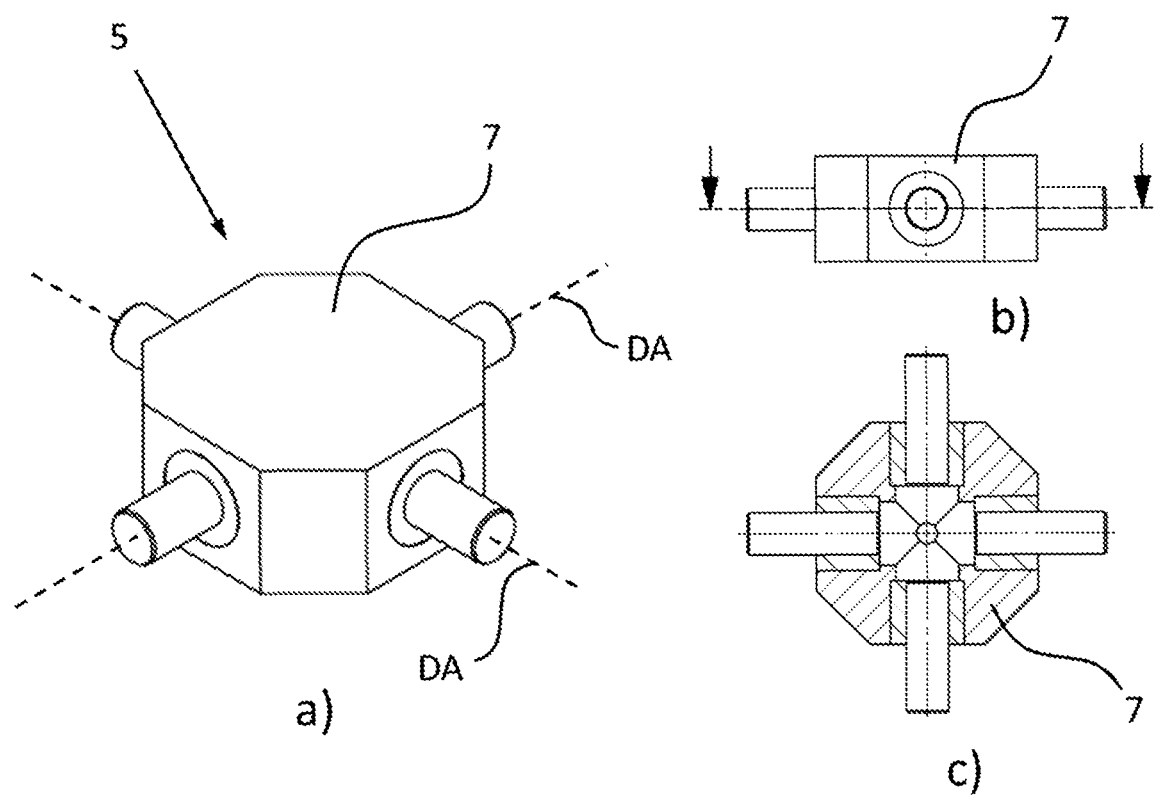
Figure 5:
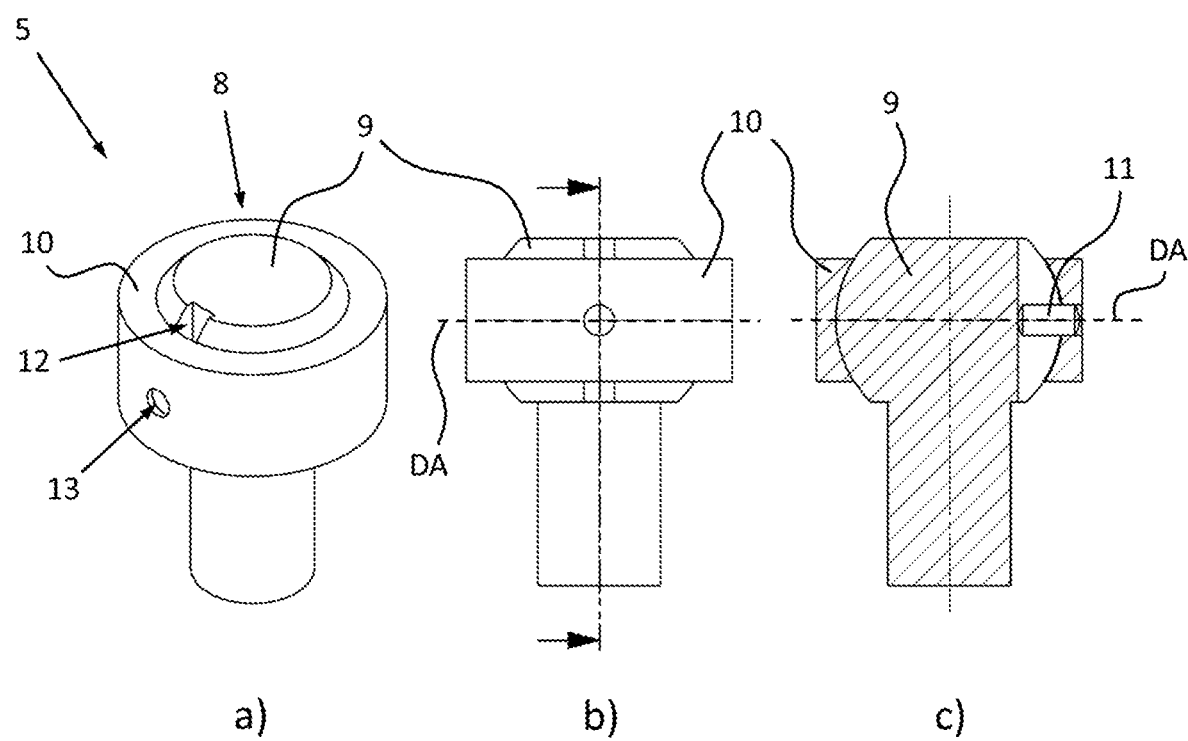

FIG. 2 shows a positioning device according to the present invention in a perspective view FIG. 3 shows an articulation element in the form of a cardan joint of a positioning device according to the present invention in a perspective representation FIG. 4 a-c show different views of an articulation element in the form of a universal joint of a positioning device according to the present invention FIG. 5 a-c show different views of an articulation element in the form of a ball joint of a positioning device according to the present invention FIG. 1 shows, in a perspective view, an embodiment of a positioning device 1 according to the present invention. In order to show the internal structure more clearly, the positioning element of the positioning device has been omitted in FIG. 1.

A stationary base 2, which comprises three side walls adjoining one another in such a way that a respective side wall is in contact with the other two side walls, the respective side walls being arranged in pairs perpendicular to one another, has arranged thereon a total of six leg elements 4 that are variable in length, each leg element having its respective end connected to the base 2 via an articulation element 5 in the form of a cardan joint 6. Each of the three side walls of the base 2 has arranged thereon two identically configured leg elements 4, which are oriented parallel to each another and which form a respective pair. The resultant three pairs of leg elements 4 (hereinafter referred to as "pairs of legs") are arranged relative to one another such that a respective pair of legs projects through another pair of legs and each pair of legs is arranged perpendicular to the other pair of legs. This arrangement results in a very space-saving configuration of the positioning device, with all six leg elements being accommodated within the cuboid space of the base 2 defined by the three side walls.

Each leg element 4 has, on its end facing away from the base 2, an articulation element 5 in the form of a cardan joint 6, which is configured identically with the articulation element 5 arranged on the end of the respective leg element 4 facing the base 2 and which provides a connection of the leg element 4 to the base 2. The articulation element 5 arranged on the end of the leg element 4 facing away from the base 2 is here provided for connection to the positioning element, which is part of the positioning device 1 and which is not shown in FIG. 1.

The respective articulation elements 5, which are each configured as a cardan joint 6, have two axes of rotation DA arranged perpendicular to each another, the axes of rotation neither intersecting each other nor penetrating through each other. In other words, the two axes of rotation DA of a cardan joint do not lie in a common plane.

Each of the length-variable leg elements 4 has in its interior an electric drive in the form of a spindle motor (not visible in FIG. 1). A synchronous control of the leg elements of a pair of legs, i.e. a change in length of the two leg elements of a pair of legs in the same direction, leads to a translational movement of the positioning element along a respective spatial axis, while control of only one of the two leg elements of a pair of legs or a control of the leg elements of a pair of legs that leads to oppositely directed changes in length of the two leg elements results in a corresponding rotation of the positioning element. It goes without saying that superpositions of the movements (i.e. translations and/or rotations) caused by the different pairs of legs on the positioning element are possible.

FIG. 2 shows the positioning device 1 according to FIG. 1 together with the positioning element 3. The positioning element 3 has a shape that is almost identical to the shape of the base 2, i.e. it comprises three side walls adjoining one another in such a way that a respective side wall is in contact with the other two side walls, the respective side walls being arranged in pairs perpendicular to one another, i.e. also they define a cuboid space. The base 2 and the positioning element 3 are here arranged relative to each other in such a way that the two together form almost a cuboid shape. The thus extremely compact dimensions of the positioning device result, as has already been explained hereinbefore, from the specific arrangement of the pairs of legs which mutually penetrate one another.

FIG. 3 shows an articulation element 5 of a positioning device according to the present invention in the form of a cardan joint 6, wherein the two axes of rotation DA arranged perpendicular to each other do not extend in the same plane and thus do not penetrate each other. In other words, the two axes of rotation of the cardan joint 6 cross each other, but they do not intersect or penetrate each other.

FIG. 4 a) to c) show a further embodiment of an articulation element 5 of the positioning device according to the present invention in the form of a universal joint 7 in different views (perspective view in FIG. 4a), side view in FIG. 4b) and sectional view according to FIG. 4b) in FIG. 4c)). In the case of this embodiment, the two axes of rotation DA, which are arranged perpendicular to each other, intersect or penetrate each other.

FIG. 5 a) to c) show a further embodiment of an articulation element 5 of the positioning device according to the present invention in the form of a special ball joint 8. The ball joint comprises a spherical bearing head 9 and a complementarily shaped bearing sleeve 10, in which the bearing head 9 is arranged. The bearing head 9 has a groove-shaped recess 12, while the bearing sleeve has an opening 13. A pin-shaped and round blocking element 11 is supported and/or retained with one of its ends in the opening 13, while the end of the pin-shaped blocking element 11 opposite thereto projects into and cooperates with the groove-shaped recess 12 of the bearing head 9.

On the basis of the pin-shaped blocking element 11 and its cooperation with the groove-shaped recess 12 in the bearing head 9 and with the opening 13 in the bearing sleeve 10, respectively, the many possible degrees of freedom of the ball joint 8 are highly restricted. For example, the cooperation of the pin-shaped blocking element 11 with the groove-shaped recess 12 allows a tilting movement of a leg element, connected to the ball joint 8, in a plane defined by the respective orientation of the groove-shaped recess 12. In this case, the orientation of the respective axis of rotation DA is perpendicular to a longitudinal axis of the pin-shaped blocking element 11.

Likewise, the cooperation of the pin-shaped blocking element 11 with the groove-shaped recess 12 allows a tilting movement of a leg element, connected to the ball joint 8, about an axis of rotation DA that is parallel to a longitudinal axis of the pin-shaped blocking element 11 and coincides with the central longitudinal axis of the pin-shaped blocking element 11, respectively.

The special embodiment of the ball joint according to FIG. 5 thus results in two remaining degrees of freedom, while all other possible degrees of freedom of the ball joint are inhibited.

LIST OF REFERENCE NUMERALS 1 positioning device
2 base
3 positioning element
4 leg element
5 articulation element
6 cardan joint
7 universal joint
8 ball joint
9 bearing head
10 bearing sleeve
11 pin-shaped blocking element
12 groove-shaped recess (of the bearing head 9)
13 opening (of the bearing sleeve 10)
DA axis of rotation

The invention claimed is:

1. A positioning device comprising:
a base; and
a positioning element, which is configured to be adjusted with respect to six degrees of freedom relative to the base, wherein the positioning element is coupled to the base via;
at least three pairs of length-variable and electrically driven leg elements, each of the at least six leg elements being connected, at its two ends, to the base and the positioning element via an articulation element, wherein a respective pair of legs projects through another pair of legs and each pair of legs is arranged perpendicular to the respective other pairs of legs; and
wherein each of the articulation elements associated with a leg element has only two axes of rotation (DA), which are arranged perpendicular to each other, so that the articulation elements allow pivotal movements of each respective leg element in precisely two planes that are perpendicular to each other and run through a longitudinal axis of the leg element, and at the same time prevent a rotational movement about a longitudinal axis of the leg element.

2. The positioning device according to claim 1, wherein the articulation element is configured as a cardan joint or as a universal joint.

3. The positioning device according to claim 2, wherein the two axes of rotation (DA) of the articulation element do not intersect each other.

4. The positioning device according to claim 3, wherein each leg element comprising:
   a spindle drive.

5. The positioning device according to claim 1, wherein the two axes of rotation (DA) of the articulation element do not intersect each other.

6. The positioning device according to claim 1, wherein the articulation element is configured as a ball joint comprising:
   a spherical bearing head; and
   a complementarily shaped bearing sleeve in which the bearing head is arranged, the bearing head and the bearing sleeve having arranged between them;
   a pin-shaped blocking element, which projects into and cooperates with a groove-shaped recess of the bearing head and which is supported in an opening of the bearing sleeve.

7. The positioning device according to claim 6, wherein each leg element comprising:
   a spindle drive.

8. The positioning device according to claim 1, wherein each leg element comprising:
   a spindle drive.

* * * * *